(12) United States Patent
Mansour

(10) Patent No.: US 6,483,823 B1
(45) Date of Patent: Nov. 19, 2002

(54) CELLULAR/PCS CDMA SYSTEM WITH INCREASED SECTOR CAPACITY BY USING TWO RADIO FREQUENCIES

(75) Inventor: Nagi A. Mansour, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/250,646

(22) Filed: Feb. 16, 1999

(51) Int. Cl.[7] .......................... H04B 7/216; H04Q 7/20
(52) U.S. Cl. .................. 370/330; 370/335; 455/447; 455/561; 455/562
(58) Field of Search .................. 370/252, 320, 370/332, 335, 342, 441, 492; 375/130, 151, 267, 335; 455/255, 259, 180.3, 442, 443, 437, 506, 522, 561, 562, 447

(56) References Cited

U.S. PATENT DOCUMENTS 5,280,472 A * 1/1994 Gilhousen et al. .......... 370/335
5,533,011 A * 7/1996 Dean et al. .................. 370/342
6,028,850 A * 2/2000 Kang .......................... 370/320
6,118,767 A * 9/2000 Shen et al. .................. 370/252
6,157,668 A * 12/2000 Gilhousen et al. .......... 375/130
6,278,867 B1 * 8/2001 Northcutt et al. ........... 455/255

OTHER PUBLICATIONS

Mogensen, P.E. "GSM Base–Station Antenna Diversity Using Soft Decision Combining on Up–link and Delayed-Signal Transmission on Down–link", IEEE 1993, pp. 611–616.*

* cited by examiner

Primary Examiner—Alpus H. Hsu
Assistant Examiner—Afsar M. Qureshi
(74) Attorney, Agent, or Firm—Harley R. Ball; Steven J. Funk; Kevin D. Robb

(57) ABSTRACT

A CDMA cellular/PCS telecommunications cell of increased capacity includes a plurality of sectors controlled by a base station unit using a defined set of CDMA codes for each sector. Capacity is increased by adding a second base station unit operating at a different, non-interfering frequency.

9 Claims, 1 Drawing Sheet

CELLULAR/PCS CDMA SYSTEM WITH INCREASED SECTOR CAPACITY BY USING TWO RADIO FREQUENCIES

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of digital cellular wireless telecommunications. In particular, the present invention is concerned with a cell for CDMA, wireless telecommunications in which capacity is increased by reconfiguring sector operations.

2. Description of the Prior Art

In the field of CDMA cellular/PCS telecommunications, a typical cell includes a base station unit controlling wireless communications using three sector antennas, each covering 120°. The base station unit uses a predefined set of sixty-four CDMA Walsh codes for each sector, with one of the codes used for pilot channel, another for synchronization, one commonly used for paging, and the remainder available for ordinary traffic.

In actual usage, however, all of the remaining channels cannot be used for traffic because of noise accumulated in the band due to a variety of reasons such as interference from adjacent cells and unused multi-path signals. With the distinct advantages of PCS/cellular communications, demand for service is substantial and in some cases, may exceed cell capacity. In the prior art, one of the solutions has been to add more base stations at the same cells to provide increased capacity. This is an expensive solution because it requires additional base stations and equipment.

SUMMARY OF THE INVENTION

The present invention solves the prior art problems discussed above and provides a distinct advance in the state of the art. In particular, the system hereof provides an economical and time effective way in which to increase the capacity of a cell in a cellular/PCS telecommunications network.

The preferred cell includes a cell site configured into a plurality of sectors having a plurality of antennas coupled with a base station unit for controlling transmission and reception over-the antennas using selected ones of a defined set of CDMA codes for each of the sectors. The preferred cell includes a plurality of antennas configuring the cell into a plurality of sectors with one base station unit operating at two different frequencies. Each sector includes two antennas coupled with one base station unit which provides two frequencies thereby increasing cell capacity.

BRIEF DESCRIPTION OF THE DRAWINGS

The single drawing FIGURE.

DETAILED DESCRIPTION OF THE PREFERRED EMBODIMENT

Figure 1:
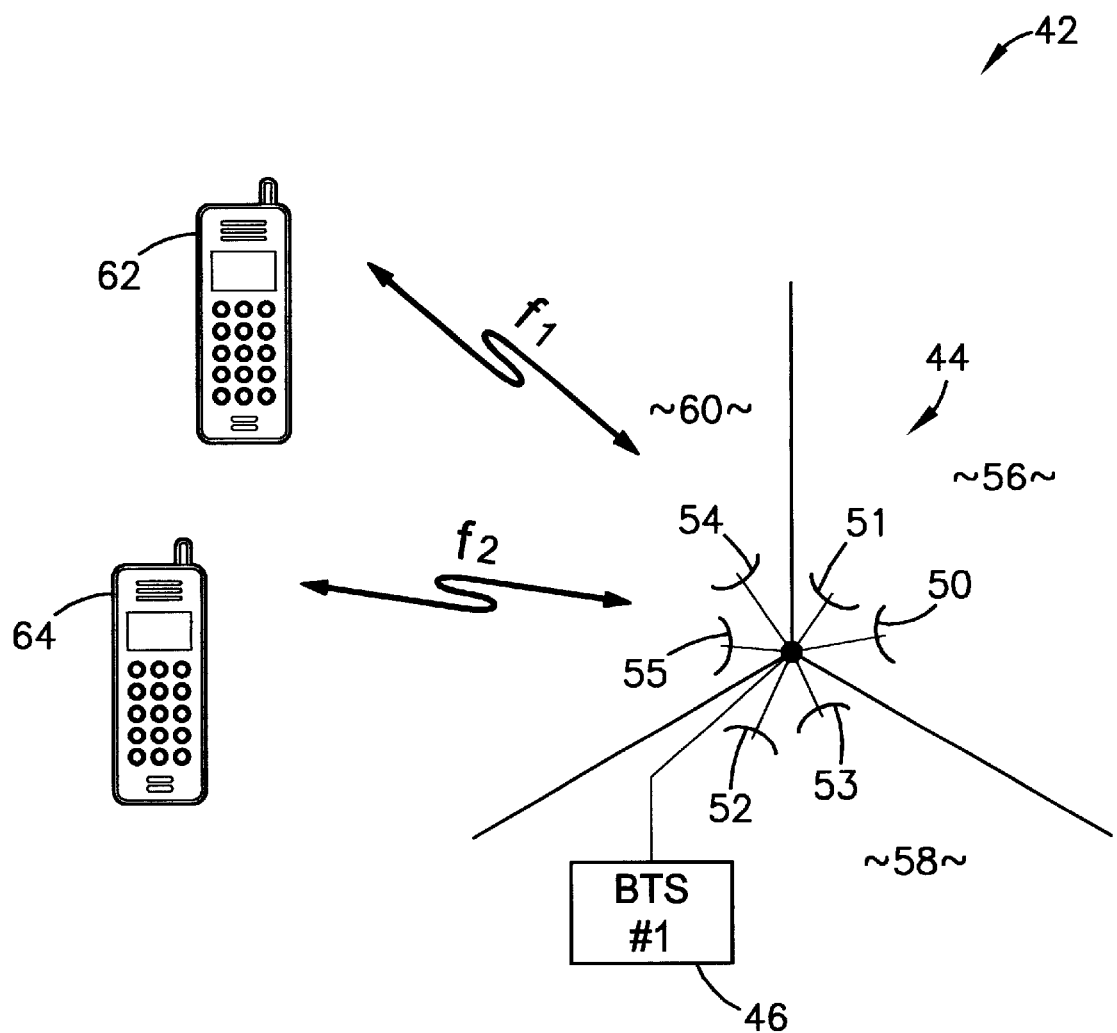
FIG. 1, is schematic representation of a CDMA cellular/PCS telecommunications cell in accordance with the present invention shown in use with one or two mobile units.

The drawing FIG. illustrates preferred CDMA cellular/PCS telecommunications cell 42 shown in use with mobile units 62 and 64 such as a hand-held PCS telephones which could also be a pager, computer modem or the like. Either mobile unit 62, 64 can access either of two frequencies designated as $f_1$, and $f_2$. Cell 42 is preferably part of a CDMA cellular/PCS telecommunications network interfaced with other networks such as a local exchange carrier (LEC) and interexchange carrier (IXC). As those skilled in the art appreciate, a cell typically includes one extra antenna per sector used for diversity. In the present invention, this second antenna is used for transmitting the second frequency.

Telecommunications cell 42 in accordance with the present invention includes antenna site 44 and one base station unit (BTS) 46. Antenna site 44 includes antennas 50, 51, 52, 53, 54 and 55 oriented to configure cell 42 into respective sectors 56, 58 and 60 covering 120° each.

Base station unit 46 is coupled with antennas 50–55 to operate at 1931.25 MHZ, for example, as frequency $f_1$ and at frequency $f_2$ (1933.75) using sixty-four Walsh CDMA codes for each sector. The 64 codes are divided between the frequencies $f_1$ and $f_2$. It will be appreciated that frequencies $f_1$ and $f_2$ are examples of many other frequencies that can be used.

In use, one BTS 46, operates independently and this has the effect of configuring cell 42 to serve two frequencies operating in one cell, one operating at 1931.25 MHZ and the other at 1933.75 MHZ. In this way, the capacity of cell 42 is doubled. In operation, mobile units such as units 62 and 64 would be programmed to scan between frequencies $f_1$ and $f_2$, locking onto the strongest pilot channel signal when service is desired.

Those skilled in the art will appreciate that the present invention encompasses many variations in the preferred embodiments described herein. Having thus described the preferred embodiments of the present invention, the following is claimed as new and desired to be secured by Letters Patent.

What is claimed is:

1. In a CDMA cellular/PCS telecommunications network, a telecommunications cell comprising:
    an antenna site configured into a plurality of sectors, with each sector having a first and a second antenna; and
    a base station unit coupled with said antennas and operable for controlling transmission and reception thereover using selected ones of a defined set of CDMA codes for each of said sectors at a first frequency for the first antenna in each sector and using selected ones of a defined set of CDMA codes for each of said sectors at a second frequency for the second antenna in each sector.

2. The cell as set forth in claim 1, said antenna site including antennas oriented for configuring said site into three corresponding sectors.

3. The cell as set forth in claim 1, wherein said first frequency includes 1931.25 MHZ.

4. The cell as set forth in claim 1, wherein said second frequency includes 1933.75 MHZ.

5. The cell as set forth in claim 1, wherein said base station unit controls transmission and reception over each antenna simultaneously.

6. A method of operating a cell having an antenna site in a CDMA cellular/PCS telecommunications network, said method comprising the steps of:
- (a) transmitting and receiving CDMA and cellular/PCS telecommunications at the antenna site by way of a plurality of antennas configuring the site into a plurality of sectors; and
- (b) using a base station unit coupled with said antennas for transmitting and receiving using selected ones of a defined set of CDMA codes for each of said sectors at a first frequency and a second frequency.

7. The method as set forth in claim 6, step (b) including the step of using 1900 MHZ as said first frequency.

8. The method as set forth in claim 6, step (b) including the step of using 1924 MHZ as said first frequency.

9. the method as set forth in claim 6, step (a) including the step of using three antennas oriented for configuring the site into three sectors.

* * * * *